(12) United States Patent
Hatton et al.

(10) Patent No.: US 10,836,333 B2
(45) Date of Patent: Nov. 17, 2020

(54) METHODS AND APPARATUS FOR WIRELESS DEVICE APPLICATION HAVING VEHICLE INTERACTION

(71) Applicant: FORD GLOBAL TECHNOLOGIES, LLC, Dearborn, MI (US)

(72) Inventors: David Anthony Hatton, Berkley, MI (US); Anthony Gerald King, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 15/641,948

(22) Filed: Jul. 5, 2017

(65) Prior Publication Data

US 2017/0297518 A1 Oct. 19, 2017

Related U.S. Application Data

(63) Continuation of application No. 13/151,729, filed on Jun. 2, 2011, now abandoned.

(51) Int. Cl.
*G08B 21/00* (2006.01)
*B60R 16/037* (2006.01)
*G07C 5/08* (2006.01)

(52) U.S. Cl.
CPC ........ *B60R 16/037* (2013.01); *B60K 2370/55* (2019.05); *B60K 2370/56* (2019.05); *G07C 5/0825* (2013.01); *G07C 5/0833* (2013.01)

(58) Field of Classification Search
CPC .. B60R 16/037; G07C 5/0833; G07C 5/0825; B60K 2370/55; B60K 2370/56

(Continued)

(56) References Cited

U.S. PATENT DOCUMENTS 6,526,335 B1 2/2003 Treyz et al.
7,207,041 B2 4/2007 Elson et al.
(Continued)

FOREIGN PATENT DOCUMENTS

CN 1492297 A 4/2004
CN 101386254 A 3/2009
(Continued)

OTHER PUBLICATIONS

Human machine interface to manually drive rhombic like vehicles in remote handling operations; Pedro Lopes et al.; 2015 4th Inter. Conf.on Advancements in Nuclear Instrumentation Measurement Methods and their Applications (ANIMMA); 2015; pp. 1-8.*

(Continued)

*Primary Examiner* — Cuong H Nguyen
(74) *Attorney, Agent, or Firm* — Michael Spenner; Brooks Kushman P.C.

(57) ABSTRACT

A computer-implemented remote starting method includes instructing the remote start of a vehicle using a wireless device. The method also includes inputting, to the wireless device, a desired vehicle interior temperature. The method further includes sending a remote start instruction to a vehicle from the wireless device, including at least the desired temperature and monitoring a current temperature of the vehicle. The method additionally includes outputting, on the wireless device, the current vehicle temperature.

5 Claims, 7 Drawing Sheets

(58) Field of Classification Search
USPC ...... 715/727, 771, 733, 744; 701/2; 340/801
See application file for complete search history.

(56) References Cited

U.S. PATENT DOCUMENTS

| | | | |
|---|---|---|---|
| 7,266,435 B2 | 9/2007 | Wang et al. | |
| 7,474,943 B2 | 1/2009 | Matsubara et al. | |
| 7,502,673 B2 | 3/2009 | Robinson et al. | |
| 7,505,784 B2 | 3/2009 | Barbera | |
| 7,602,782 B2 | 10/2009 | Doviak et al. | |
| 7,650,864 B2 | 1/2010 | Hassan et al. | |
| 7,801,941 B2 | 9/2010 | Conneely et al. | |
| 7,937,667 B2* | 5/2011 | Kramer | B60K 35/00 715/744 |
| 8,447,598 B2* | 5/2013 | Chutorash | G01C 21/3661 704/231 |
| 8,904,308 B2* | 12/2014 | Kramer | B60K 35/00 715/781 |
| 9,352,834 B2* | 5/2016 | Davies | G01S 15/88 |
| 9,797,881 B2* | 10/2017 | Biondo | G01N 33/0073 |
| 10,356,122 B2* | 7/2019 | Ruvio | H04L 63/1466 |
| 10,365,654 B2* | 7/2019 | Wood | B60K 28/12 |
| 2002/0098853 A1 | 7/2002 | Chrumka | |
| 2003/0079123 A1 | 4/2003 | Mas Ribes | |
| 2003/0147534 A1 | 8/2003 | Ablay et al. | |
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0010336 A1 | 1/2005 | Matsubara et al. | |
| 2005/0091408 A1 | 4/2005 | Parupudi et al. | |
| 2005/0177635 A1 | 8/2005 | Schmidt et al. | |
| 2005/0225175 A1 | 10/2005 | Maehara | |
| 2006/0150197 A1 | 7/2006 | Werner | |
| 2006/0156315 A1 | 7/2006 | Wood et al. | |
| 2006/0190097 A1 | 8/2006 | Rubenstein | |
| 2006/0220806 A1 | 10/2006 | Nguyen | |
| 2006/0255960 A1* | 11/2006 | Uken | B60K 35/00 340/815.4 |
| 2006/0271246 A1 | 11/2006 | Bell et al. | |
| 2006/0287787 A1 | 12/2006 | Engstrom et al. | |
| 2006/0287821 A1 | 12/2006 | Lin | |
| 2007/0016362 A1 | 1/2007 | Nelson | |
| 2007/0042809 A1 | 2/2007 | Angelhag | |
| 2007/0042812 A1 | 2/2007 | Basir | |
| 2007/0050854 A1 | 3/2007 | Cooperstein et al. | |
| 2007/0132572 A1 | 6/2007 | Itoh et al. | |
| 2007/0294625 A1 | 12/2007 | Rasin et al. | |
| 2008/0077882 A1* | 3/2008 | Kramer | B60K 35/00 715/810 |
| 2008/0114502 A1 | 5/2008 | Breed et al. | |
| 2008/0117079 A1 | 5/2008 | Hassan | |
| 2008/0148374 A1 | 6/2008 | Spaur | |
| 2008/0220718 A1 | 9/2008 | Sakamoto et al. | |
| 2008/0313050 A1 | 12/2008 | Basir | |
| 2009/0040306 A1* | 2/2009 | Foote | B60R 1/082 348/148 |
| 2009/0064696 A1 | 3/2009 | Perkins | |
| 2009/0075624 A1 | 3/2009 | Cox et al. | |
| 2009/0099711 A1 | 4/2009 | Matsubara et al. | |
| 2009/0106036 A1 | 4/2009 | Tamura et al. | |
| 2009/0117890 A1 | 5/2009 | Jacobsen et al. | |
| 2009/0228908 A1 | 9/2009 | Margis et al. | |
| 2009/0253466 A1 | 10/2009 | Saito et al. | |
| 2009/0318119 A1 | 12/2009 | Basir et al. | |
| 2010/0063670 A1 | 3/2010 | Brzezinski et al. | |
| 2010/0094996 A1 | 4/2010 | Samaha | |
| 2010/0098853 A1 | 4/2010 | Hoffmann et al. | |
| 2010/0106363 A1 | 4/2010 | Mandujano | |
| 2010/0216509 A1 | 8/2010 | Riemer et al. | |
| 2010/0234071 A1 | 9/2010 | Shabtay et al. | |
| 2010/0306309 A1 | 12/2010 | Santori et al. | |
| 2011/0074561 A1 | 3/2011 | Makjust et al. | |
| 2011/0105097 A1 | 5/2011 | Tadayon et al. | |
| 2011/0112762 A1 | 5/2011 | Gruijters et al. | |
| 2011/0195659 A1 | 8/2011 | Boll et al. | |
| 2011/0202862 A1* | 8/2011 | Kramer | B60K 35/00 715/771 |
| 2011/0296037 A1 | 12/2011 | Westra et al. | |
| 2012/0054300 A1 | 3/2012 | Marchwicki et al. | |
| 2012/0079002 A1 | 3/2012 | Boll et al. | |
| 2012/0101659 A1 | 4/2012 | Kim et al. | |
| 2017/0153114 A1* | 6/2017 | Boesen | G01C 21/165 |
| 2019/0143915 A1* | 5/2019 | Lei | B60R 16/0237 701/29.2 |

FOREIGN PATENT DOCUMENTS

| | | |
|---|---|---|
| DE | 102010062167 A1 | 4/2012 |
| JP | S62091656 A | 4/1987 |
| JP | 2012090514 A | 5/2012 |
| KR | 1181186 B1 | 9/2012 |

OTHER PUBLICATIONS

Analysis of attacks against the security of keyless-entry systems for vehicles and suggestions for improved designs A.I. Alrabady ; S.M. Mahmud;IEEE Transactions on Vehicular Technology pp. 41-50, vol. 54 issue 1. year 2005.*
Vehicle security systems; J Bowe, B Kordowski, A Walther . . . — Automotive Mechatronics, 2015—Springer (Year: 2015).*
An i-Electric System Architecture for EVs; P Neves, B Ribeiro, A Dias—2013—sae.org (Year: 2013).*
Ubiquitous Computing: A New Era of Computing S Gupta, R Sapra, S Midha—From Visual Surveillance to Internet . . . , 2019—books.google.com (Year: 2019).*
Chinese Patent Office, Second Office Action for the corresponding Chinese Patent Application No. 021210173968.5, dated Jul. 25, 2016.
Voelcker, Top 10 Tech Cars It's the Environment, Stupid, www.SPECTRUM.IEEE.ORG, Apr. 2008, pp. 26-35.
Yarden, et al., TUKI: A Voice-Activated Information Browser, IEEE, 2009, pp. 1-5.
Gil-Castineira, et al., Integration of Nomadic Devices with Automotive User Interfaces, IEEE Transaction on Consumer Electronics, vol. 55, No. 1, Feb. 2009.
Nusser et al., Bluetooth-based Wireless Connectivity in an Automotive Environment, Robert Bosch GmbH, VTC 2000, pp. 1935-1942.
Autuan Goodwin, The Car Tech Blog, Ford Unveils open-source Sync Developer plat.form, http://reviews.cnet.com/8301-13746_7-10385619-48.html, Oct. 2009, pp. 1-5.
Service Discovery Protocol (SDP) Layer Tutorial, Palowireless Bluethooth Research Center, http://www.palowireless.com/infotooth/tutorial/sdp.asp. Aug. 3, 2010.
Iphone Hacks, Apple Files Patent Which Allow You to Control Your Computer Remotely using iPhone, http://www.iphonehacks.com/2009/12/apple-files-patent-which-could-allow-you-to-control-your-computer-remotely-using-iphone, Jun. 22, 2010.
Zach Newmark, American, Concept Car, Ford Gadgets, Lifestyle, Technology, Student develop in-car cloud computing apps; envision the future of in-car connectivity, May 4, 2010, http://www.worldcarfans.com/pring/110050425986/student-develop-in-car-cloud-computing_apps;_envision_the_future_of_in-car_connectivity.
Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.
Wikipedia, the free encyclopedia, X Window System, http://en.wikipedia.org/widi/X_Window_System, Jun. 22, 2010.
"MobileSafer is your personal safe driving assistant", 2010 ZoomSafer Inc. <http://zoomsafer.com/products/mobilesafer> Dec. 28, 2010.
"How PhonEnforcer Works" Turn Off the Cellphone While Driving—PhonEnforcer. Turn Off the Cell Phone LLC, <http://turnoffthecellphone.com/howitworks.htm> Dec. 28, 2010, pp. 1-3.
"PhonEnforcer FAQ's" turn Off the Cellphone While Driving-PhonEnforcer. Turn Off the Cell Phone LLC. <http://turnoffthecellphone.com/faq.html> Dec. 28, 2010, pp. 1-2.

(56) References Cited

OTHER PUBLICATIONS

Lamberti, Ralph, "Daimler Full Circle: The Rise of Vehicle-Installed Telematics—Telematics Munich 2009" Nov. 10, 2009.
Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation system," owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem", Automotive Design & Production, Oct. 2003, httpL//findarticles.com, pp. 1-3.
Narasimhan et al., A lightweight remote display management protocol for mobile devices, Application Research Center, Motorola Labs Schaumburg, IL, 2007, pp. 711-715.

\* cited by examiner

METHODS AND APPARATUS FOR WIRELESS DEVICE APPLICATION HAVING VEHICLE INTERACTION

CROSS-REFERENCE TO RELATED APPLICATIONS

This application is a continuation of U.S. patent application Ser. No. 13/151,729 filed on Jun. 2, 2011, now abandoned, the disclosure of which is incorporated in its entirety by reference herein.

TECHNICAL FIELD

The illustrative embodiments generally relate to methods and apparatus for a wireless device application having vehicle interaction

BACKGROUND

As full display enabled wireless devices become more common, especially in the form of the phones that many people carry and use on a daily basis, there is a growing demand for applications which can run on these same platforms. Smartphone/PDA developers have provided open, or relatively open, platforms on which users can develop applications. Effectively, the phone has become a smaller version of a laptop computer.

Since there are a variety of situations in which one is likely to have a phone, but not a computer, there are a similar variety of applications released which have functionality related to that which one would desire in a phone-based environment. For example, people can download mapping applications to track a route through a park, shopping applications to check prices on items in the store, etc.

But, since there are a virtually limitless number of situations into which one may carry a phone, there are a similarly virtually limitless number of applications which can address those situations. Many applications are small in nature and are developed to address a single or a limited set of circumstances.

SUMMARY

In a first illustrative embodiment, a computer-implemented remote starting method includes instructing the remote start of a vehicle using a wireless device. The exemplary method also includes inputting, to the wireless device, a desired vehicle interior temperature.

The illustrative method further includes sending a remote start instruction to a vehicle from the wireless device, including at least the desired temperature and monitoring a current temperature of the vehicle.

The exemplary method additionally includes outputting, on the wireless device, the current vehicle temperature.

In a second illustrative embodiment, a computer-implemented method, executable by a vehicle associated computing system, includes checking a digital calendar for at least one temporally proximate appointment having an associated address. The exemplary method further includes determining a current vehicle location.

The exemplary method additionally includes estimating a travel time from the current vehicle location to the address associated with the at least one appointment. Also, the exemplary method includes outputting a recommended departure time, the recommended departure time no later than an at least one appointment start time less the estimated travel time.

In a third illustrative embodiment, a computer-implemented method, executable by a vehicle associated computing system (VACS), includes estimating a travel time to a destination and determining if a vehicle is likely to reach the destination within a temporal proximity to an appointment time, based at least in part on the current time and the estimated travel time.

In this exemplary method, if the vehicle is estimated to arrive later than the temporal proximity to the appointment time, the driver is notified that the driver may be late to an appointment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Integration of various functions with a vehicle computing system can provide for a seamless user in-vehicle experience. By providing the user with automatic processing for a variety of functions that normally may require a user to remove attention from the road, the illustrative embodiments help provide a user experience that allows a user to spend more time focused on driving, and less time focused on using a wireless device.

Additionally, the illustrative embodiments allow adjustment of settings for a vehicle computing system, which may be particularly useful if the vehicle otherwise lacks a graphical interface. In this situation, the wireless device running the illustrative processes can serve as a proxy for an in-vehicle display.

Figure 1:
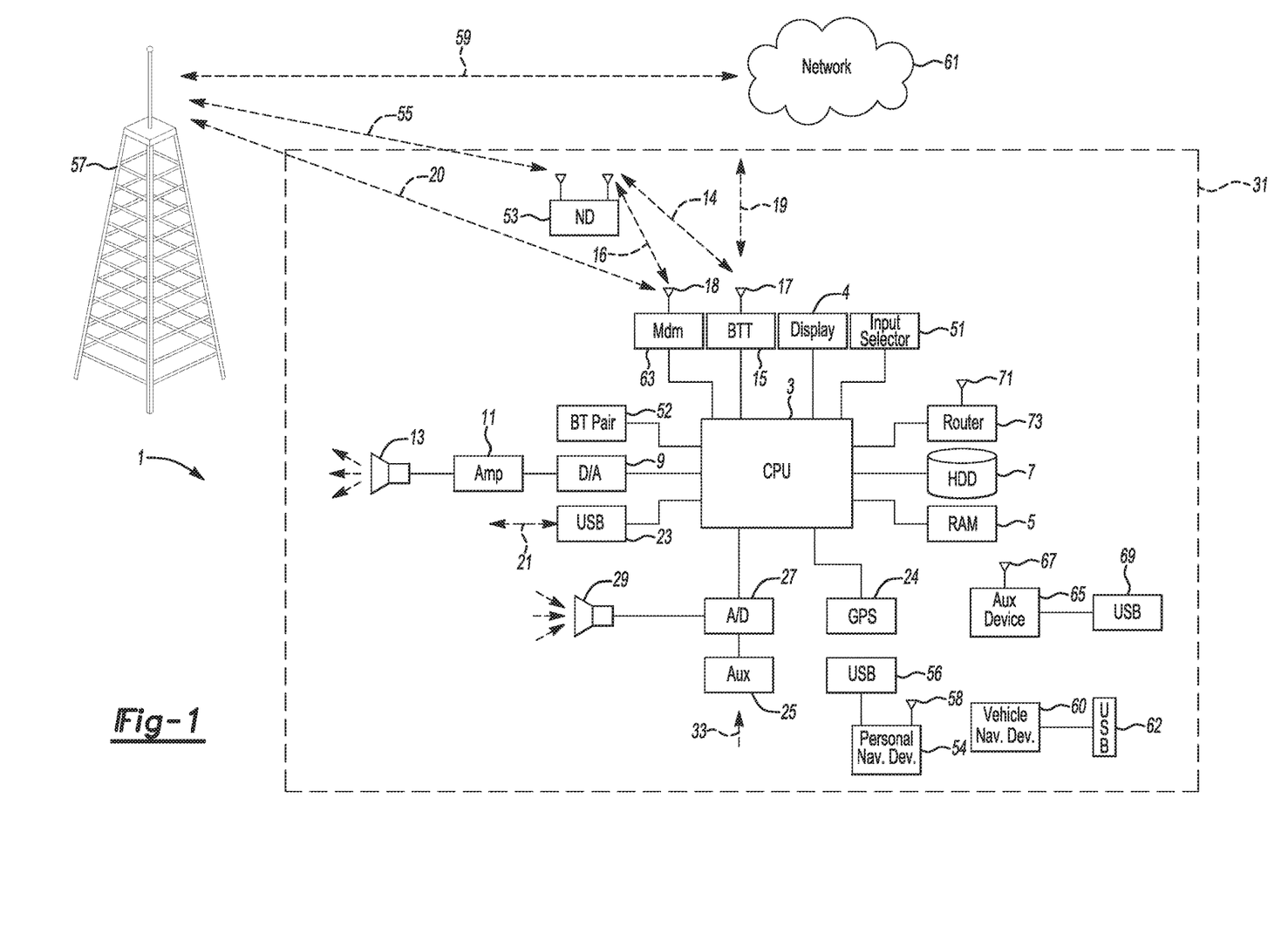
FIG. 1 shows an illustrative example of a vehicle associated computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a cellular phone or other wireless device or a remote server connected through a wireless device. Collectively, such systems may be referred to as vehicle associated computing systems (VACS), although in certain embodiments only some of the VACS may perform a particular process, depending on the steps of the process and the appropriateness of a particular system for performing those steps. E.g., without limitation, if a process has a step of sending or receiving information with a paired wireless device, then it is likely that the wireless device is not performing the process, since the wireless device would not "send and receive" information with itself. If two devices are present, however, then one wireless device may be used. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figures 2, 3:
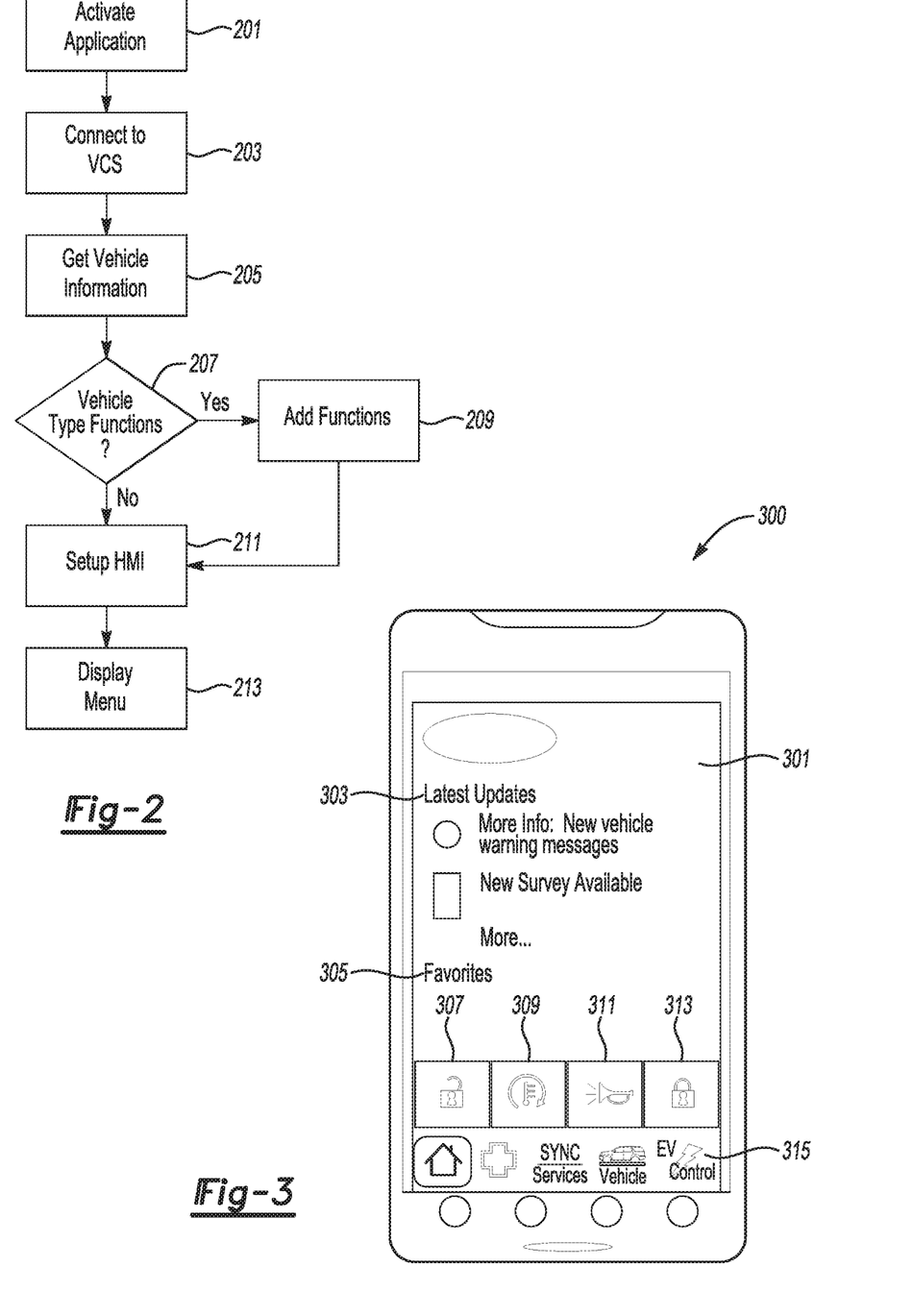
FIG. 2 shows an illustrative example of a process for application menu setup.
FIG. 3 shows an illustrative example of an application display.

FIG. 2 shows an illustrative example of a process for application menu setup. In this illustrative example, a dashboard application is launched 201. A dashboard application is an application containing a variety of secondary functionality, and one that pulls together numerous smaller applications into a comprehensive package. Although this example provides the functionality discussed herein as a dashboard application, each of the illustrative processes, and their equivalents, could be presented as individual applications.

Once the application has been launched, the application connects to a vehicle associated computing system (VACS) 203. This is the vehicle system that the application interfaces with, to the extent that such interface is needed.

Vehicle information is retrieved from the VACS 205 and may be used to customize or configure the application. For example, without limitation, the information may be used to enable or disable certain functions or features of the application. If, for example, the application has an Electric Vehicle portion, and the current vehicle is a pure gasoline powered vehicle, then the electric vehicle tab may be disabled or not enabled.

Once the vehicle information has been obtained, the process checks to see if any vehicle-specific functions need to be added 207. This could be the aforementioned electric vehicle functions, or any other vehicle-specific functionality. If functions are needed, the process adds the requisite functions 209, and then, in either case, sets up an HMI for presentation to a user 211. Once the HMI has been configured, the process displays a menu 213 for user interaction.

FIG. 3 shows an illustrative example of an application display. In this illustrative example, the display is of a "home screen" 300, although this is just one non-limiting example of a possible home screen display. This illustrative screen contains an information portion 301, and various controls and menu options.

In the information portion, in this illustrative example, the screen provides an updates section 303. In this example, this portion contains information pertaining to the VACS in general, vehicle specific updates (recalls, maintenance reminders, etc), and other consumer-useful information.

This example also contains a "favorites" portion 305. This portion may contain hot-links to functions and or other areas of the application that the user has "favorited" or which the user uses frequently.

In this example, the main screen also contains some vehicle-fob type functions. An unlock 307, remote start 309, alarm 311 and lock 313 option are all provided. Additionally, a variety of sub-menu options 315 may also be provided. Although this example shows certain functionality for a main menu, any suitable options may be displayed on this screen.

Figure 4A:
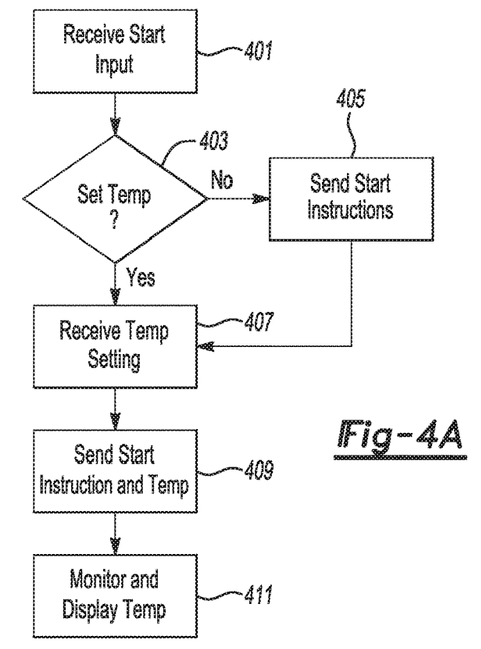
FIG. 4A shows an illustrative example of a process for remote vehicle start.

FIG. 4A shows an illustrative example of a process for remote vehicle start. In this illustrative example, the application process receives an instruction to remote start a vehicle 401. Although a "normal" fob option to remote start a vehicle may be binary (e.g., on/off), with the addition of a graphic interface, additional functionality may be possible. Many times, when a driver remote-starts a vehicle, it is done to obtain a desired vehicle temperature (e.g., heat the vehicle up or cool the vehicle down). In this illustrative example, the driver is given the option to include a desired temperature when inputting the remote start command 403. If no temperature is desired, then a simple "Start" instruction can be sent to the vehicle 405.

If the driver desires a specific temperature, a temperature setting is input 407 and a start instruction is sent in conjunction with a climate control setting 409. Also, in this illustrative example, the process monitors and displays the current vehicle temperature 411, so the driver knows when the desired temperature has been reached or is close to being reached.

Figure 4B:
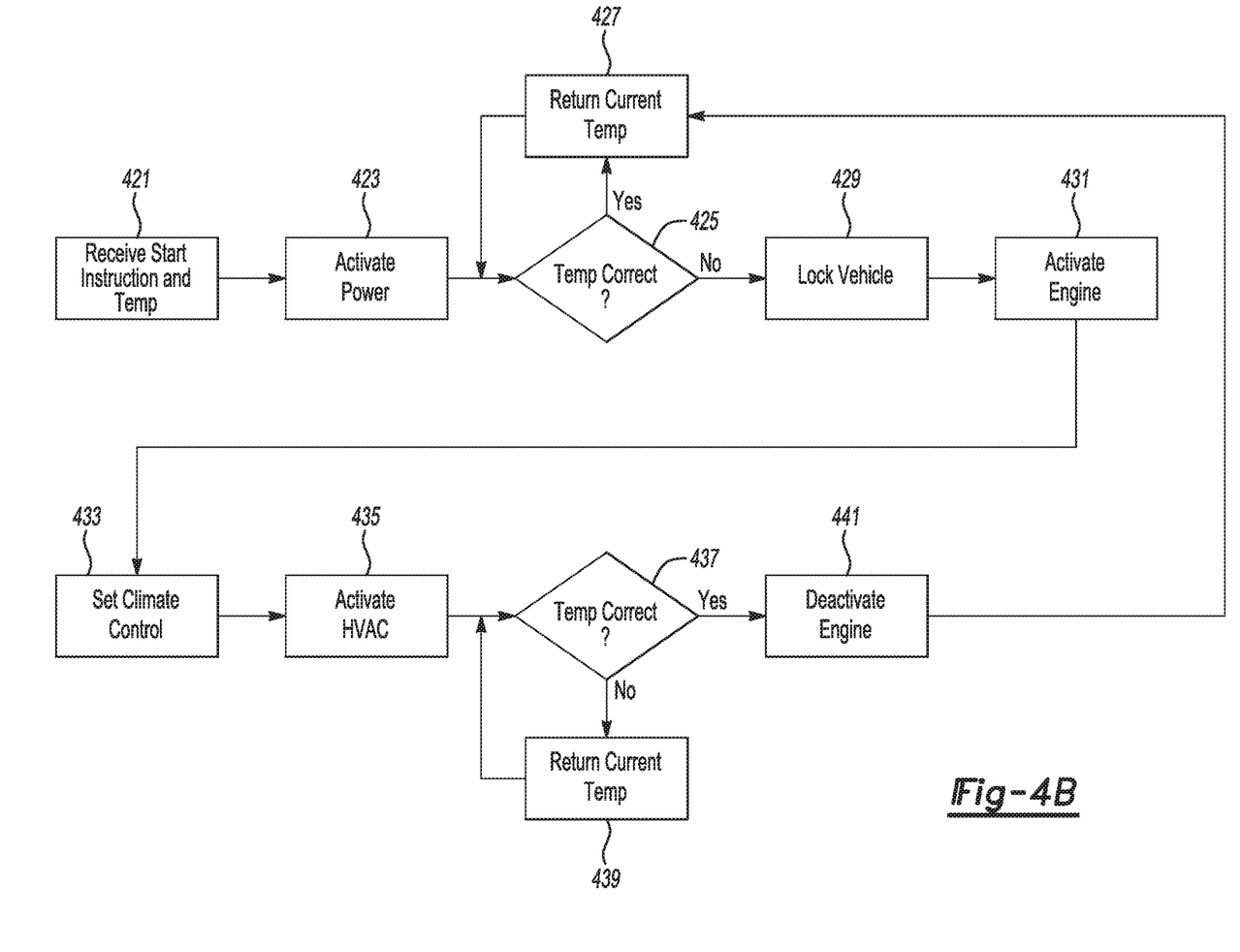
FIG. 4B shows another illustrative example of a process for remote vehicle start.

FIG. 4B shows another illustrative example of a process for remote vehicle start.

On the vehicle-side, a request to remote start the vehicle is received 421. In at least one instance, this request will also include a desired vehicle-temperature. The vehicle power (but not necessarily the engine) may be activated in response to the request 423 and a current vehicle temperature may be checked 425.

If the current vehicle temperature matches the desired temperature, then a message is sent to the instructing device with the current temperature 427 and a monitoring process may continue (in case the vehicle temperature changes). If the current vehicle temperature is not the desired temperature, then the process may first lock the vehicle (if the vehicle is not already locked) 429. The process then activates the engine 431, so that an HVAC system can be enabled. In some embodiments, engine activation may not be required to enable an HVAC system, and this step may be skipped if desired.

The vehicle climate control may then be set based on the desired temperature 433, and the HVAC system may then be activated to change the vehicle climate 435. Until the temperature is correct, the process may continue with engine activation and return the current temperature so the user can monitor the vehicle climate 439. Once the desired temperature has been reached, the engine may be deactivated (to preserve fuel, for example) 441 and the process may maintain an engine-off monitoring state in case a temperature change again occurs before the user reaches the vehicle.

Figure 5A:
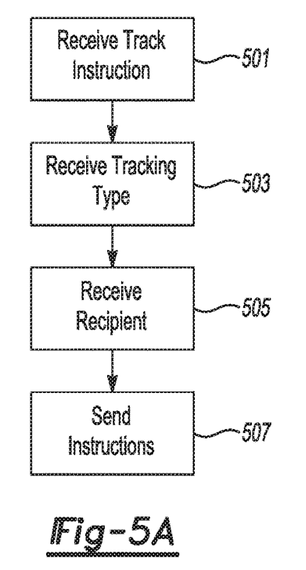
FIG. 5A shows an illustrative example of a process for vehicle data tracking.

FIG. 5A shows an illustrative example of a process for vehicle data tracking. In this illustrative example, the user activates an app function 501 related to tracking data from one or more vehicle systems (e.g., without limitation, vehicle cameras, vehicle fuel usage monitors, etc). In this illustrative process, the driver can also set what type of vehicle data is to be tracked 503.

The driver may further specify a recipient for the vehicle data 505. For example, without limitation, the driver can specify that the data be stored locally at the vehicle, on the wireless device, emailed or otherwise sent to a remote location, etc. Finally, in this example, the process sends an instruction to the VACS to begin monitoring the selected data.

Figure 5B:
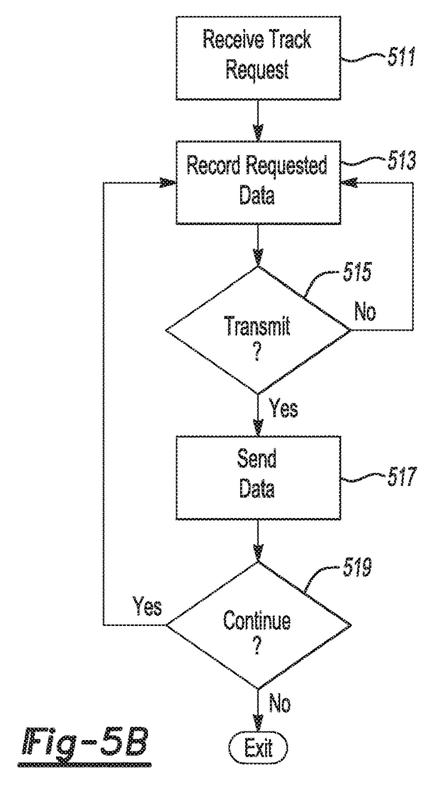
FIG. 5B shows another illustrative example of a process for vehicle data tracking.

FIG. 5B shows another illustrative example of a process for vehicle data tracking. In this illustrative example, the VACS receives a tracking request 511. The requested data type(s) are recorded 513, and transmission is made if needed 515. For example, transmission may be desired once at the end, every X period of time, every X miles, etc. If transmission is requested 515, the process sends the relevant recorded data 517 to a specified location and then determines whether or not the recording process should continue 519.

Figures 6A, 6B:
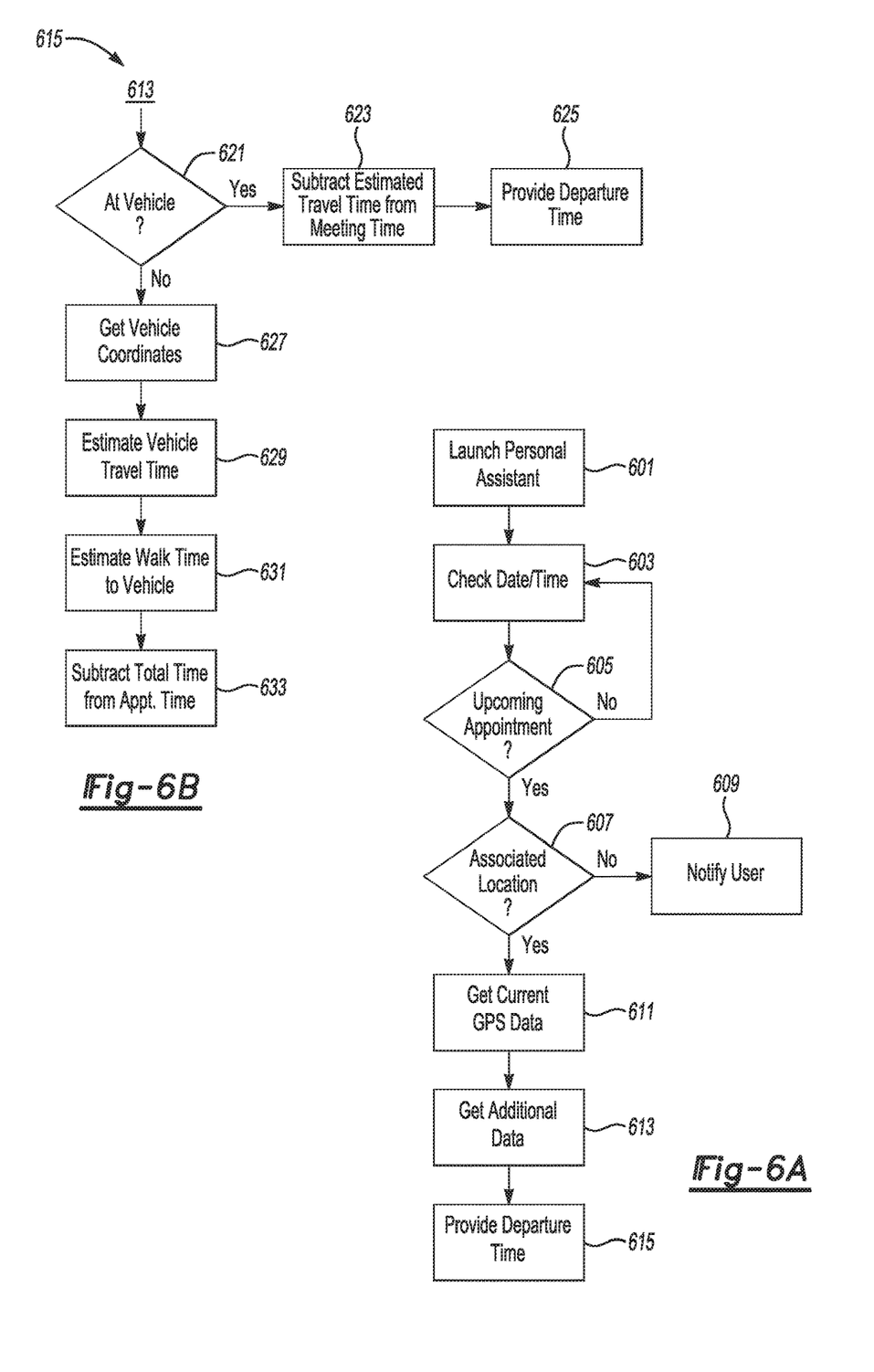
FIG. 6A shows an illustrative example of a process for a personal assistant function.
FIG. 6B shows a further illustrative example of a process for a personal assistant function.

FIG. 6A shows an illustrative example of a process for a personal assistant function. In this illustrative example, a personal assistant function has been activated by a user 601. The function may check a current date and time 603, and then, based on the date and/or time, determine if the user has any upcoming appointments 605. If there are no upcoming appointments, the process may simply spool until an appointment is within a proximity to a current time such that additional action may be taken.

If there is at least one upcoming appointment (e.g., without limitation, an appointment within a predetermined temporal proximity to the current time), the system may check to see if there is any location information associated with the appointment 607 (e.g., an address). If there is no location information, then the process may simply notify the user that there is an upcoming appointment 609. If there is location information, the process may determine the current location of the vehicle by obtaining GPS data, for example 611. This GPS data can come from the vehicle, a mobile device running the process, or another suitable provider of GPS data relating to the vehicle (e.g., a portable GPS navigation device). Additional data relating to a route between the current location and the destination may also be obtained 613.

Additional data includes, but is not limited to, data that may affect a travel time along a route. This data, for example, without limitation, can include traffic data, weather data, personal driving habits, etc. Once sufficient additional data is obtained, a departure time can be calculated, notifying the user when they should depart for the meeting location, given an estimated travel time.

FIG. 6B shows a further illustrative example of a process for a personal assistant function. In this illustrative example, the process determines if a user is currently located at a vehicle 621. This determination may be done, for example, by determining a current location of a wireless device running the process, and then determining a location of a vehicle with which the wireless device is in communication. The vehicle location may come, for example, from a VACS. If the two locations are not within a tolerance of each other, then it is likely that the user is not located at the vehicle. In a second example, if the device is not BLUETOOTH paired with the vehicle, it is assumed the device is out of proximity for such a pairing.

If the user is located at the vehicle, the process subtracts an estimated travel time from a known meeting time 623, and provides a departure time that is no later than the result of the subtraction. Additional time may be built in as well. For example, a pre-determined "transit from vehicle to meeting" threshold may be built in, such that the user doesn't arrive to park the vehicle when the user should be at the meeting. The desired departure time is then presented to the user 625.

If the user is not at the vehicle, the process may obtain the vehicle coordinates (if it doesn't have the coordinate already) 627. The process may then determine how long it estimates the vehicle will require to reach the destination point 629.

The process may then estimate a travel time from a location to the vehicle 631. In one example, this is estimation simply comprises determining, based on, for example, an average walking speed, the walking travel-time to a vehicle. Due to variances in walking speeds and multiple floors in buildings (requiring, for example, elevator travel), this estimation may be fine-tuned with additional data if required.

The two times may be aggregated to obtain a total travel time, which may then be subtracted from an appointment time 633 and the result presented to the user as a recommended departure time 625.

Figure 7:
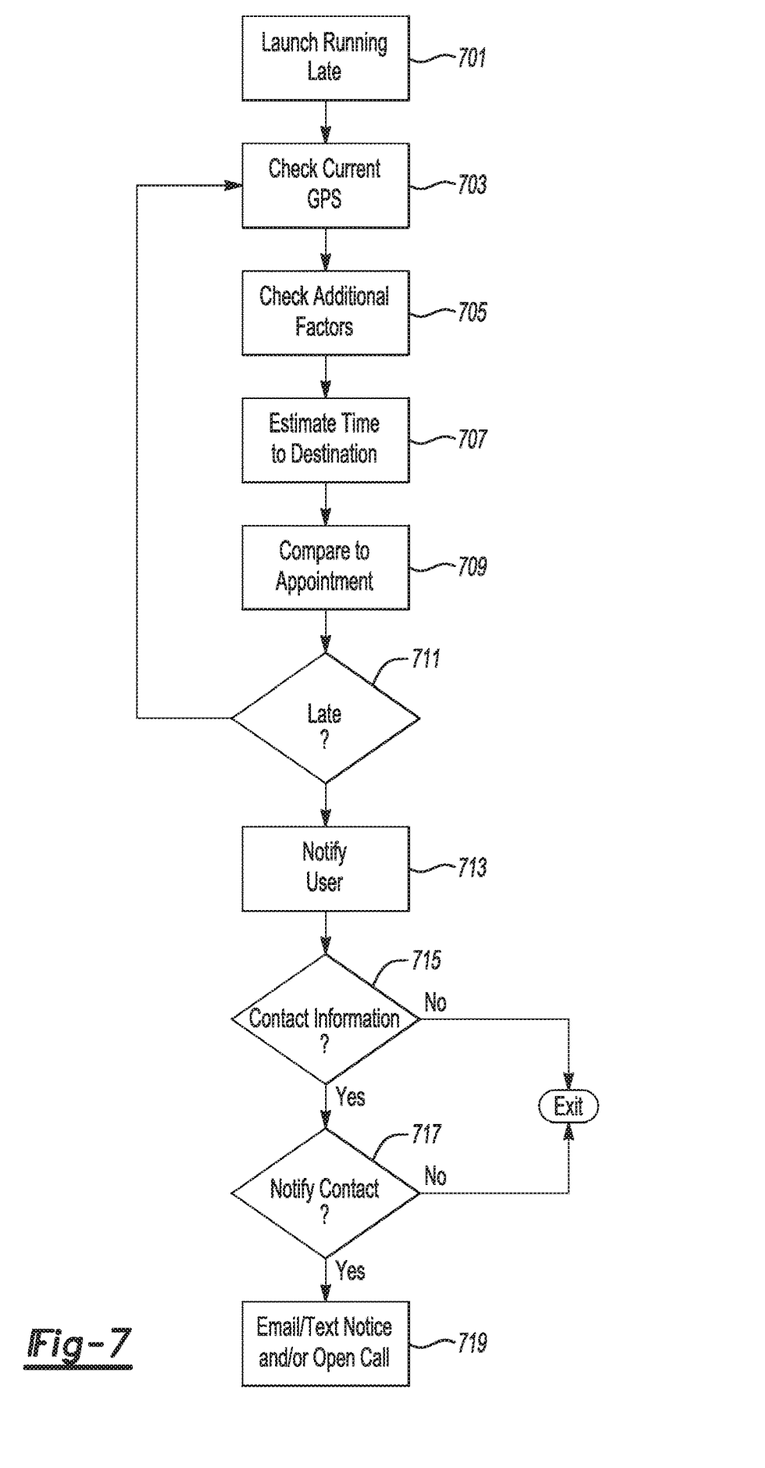
FIG. 7 shows an illustrative example of a process for a promptness determination.

FIG. 7 shows an illustrative example of a process for a promptness determination. In this illustrative example, an application process called "running late" is enabled 701. This exemplary process may check a current GPS location of the vehicle 703, and obtain any additional factors that may affect travel time (e.g., without limitation, traffic, weather, etc.) 705. The process may also estimate a time to a destination 707 and compare the estimated time to a determined appointment time 709 (based, for example, on a time set on a calendar, or a time set on a calendar plus some additional walking-time threshold). If the determined arrival time will cause the user to be late 711 (or late beyond a certain tolerance), the process may notify the user that they are running late for the appointment 713. If the user is not currently projected to be late for the appointment, the monitoring may continue in case conditions change along the route.

In addition to notifying the user of a possible late arrival, the process may also check to see if there is any contact information associated with the appointment (other attendees, an organizer, etc) 715. This information can include, but is not limited to, an email address, a phone number, a fax number, etc.

If there is usable contact information (e.g., information the process can use to send an arrival update), the process may ask the user if notification to the contact is desired 717. If notification is desired (or auto-notification is enabled, for example), the process may use the detected contact information to send an appropriate message to the contact 719. This message may include, among other things, an estimated arrival time based on the estimated arrival time determined by the process.

Figure 8:
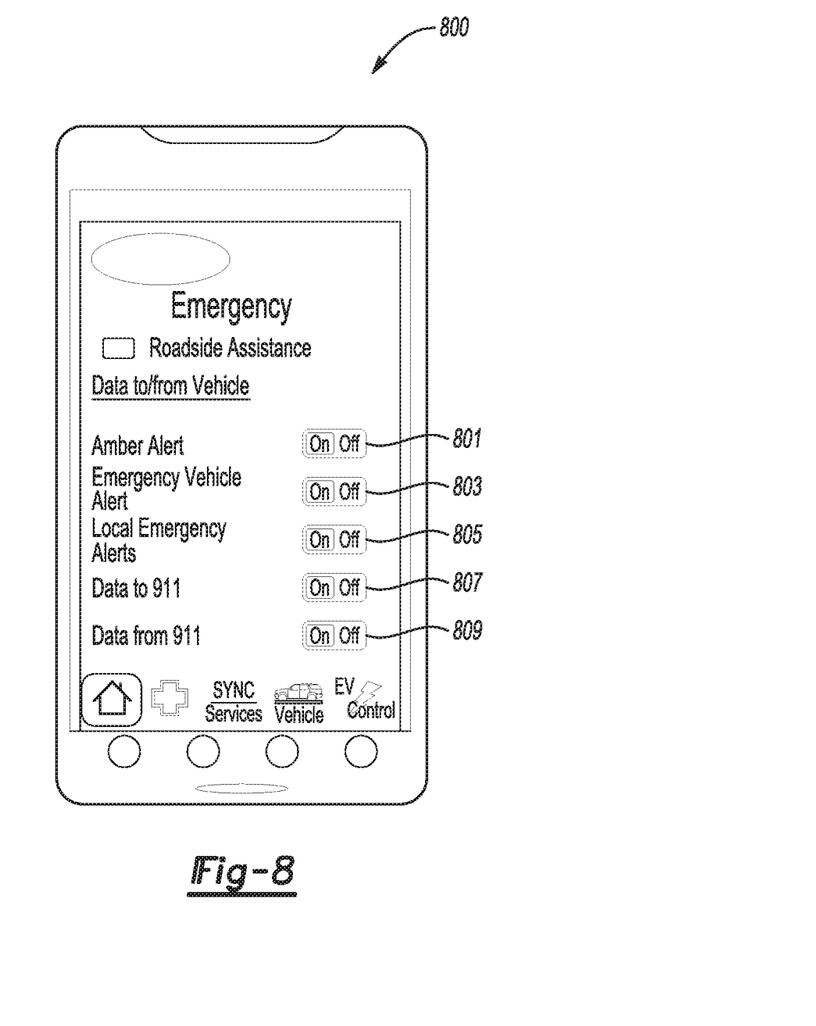
FIG. 8 shows an illustrative example of an emergency option display.

FIG. 8 shows an illustrative example of an emergency option display. In this illustrative example, an emergency configuration screen 800 includes a plurality of configurable emergency options. This illustrative embodiment provides for an option to activate mobile amber alerts 801 (to be delivered to a vehicle or wireless device, possibly based on the current location of the wireless device or vehicle).

The user also has an option to activate emergency vehicle alerts 803. In this embodiment, this pertains to notifying a user of any proximate emergency vehicles. This information may be useful for avoiding accidents, moving to the shoulder if a vehicle is approaching, etc.

The user further has an option to be notified of any local emergencies (e.g., without limitation, severe weather, fires, floods, etc) 805. Finally, in this embodiment, the user can elect to enable relay of information to and from 911. For example, without limitation, the user may have personal medical data stored on the wireless device that can be relayed to 911. This data can include, but is not limited to, medical conditions, allergies, emergency contact information, current medication, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a mobile-device processor configured to:
connect to a vehicle computing system responsive to a dashboard application launch;
retrieve user-controllable function information, identifying vehicle functions remotely controllable from a mobile device, from the vehicle computing system;
add controls for the vehicle functions to a user-HMI, or enable controls already part of the user-HMI, responsive to retrieving the vehicle functions; and
present the user HMI on the mobile device.

2. The system of claim 1, wherein the processor is further configured to add an updates section to the HMI, including information retrieved from the vehicle computing system relating to recalls or maintenance reminders.

3. The system of claim 1, wherein the vehicle functions include a lock/unlock function.

4. The system of claim 1, wherein the vehicle functions include a remote start function.

5. The system of claim 1, wherein the vehicle functions include an alarm activation function.

\* \* \* \* \*